(12) United States Patent
Rondeau

(10) Patent No.: US 10,168,519 B2
(45) Date of Patent: Jan. 1, 2019

(54) LIGHT SHEET GENERATOR

(71) Applicant: Applied Scientific Instrumentation, Inc., Eugene, OR (US)

(72) Inventor: Gary D. Rondeau, Eugene, OR (US)

(73) Assignee: Applied Scientific Instrumentation, Inc., Eugene, OR (US)

( * ) Notice: Subject to any disclaimer, the term of this patent is extended or adjusted under 35 U.S.C. 154(b) by 0 days.

(21) Appl. No.: 15/426,850

(22) Filed: Feb. 7, 2017

(65) Prior Publication Data

US 2017/0146781 A1    May 25, 2017

Related U.S. Application Data

(63) Continuation of application No. 14/595,579, filed on Jan. 13, 2015.

(60) Provisional application No. 61/927,179, filed on Jan. 14, 2014.

(51) Int. Cl.
| | |
|---|---|
| *G02B 21/06* | (2006.01) |
| *G02B 21/00* | (2006.01) |
| *G02B 26/08* | (2006.01) |
| *G02B 21/16* | (2006.01) |
| *G02B 27/30* | (2006.01) |

(Continued)

(52) U.S. Cl.
CPC ..... *G02B 21/0048* (2013.01); *G02B 21/0032* (2013.01); *G02B 21/0076* (2013.01); *G02B 21/06* (2013.01); *G02B 21/10* (2013.01); *G02B 21/16* (2013.01); *G02B 21/367* (2013.01); *G02B 26/0833* (2013.01); *G02B 27/30* (2013.01)

(58) Field of Classification Search
CPC ...... G02B 21/086; G02B 21/24; G02B 21/26; G02B 21/00; G02B 21/0048; G02B 21/0076; G02B 26/0833; G02B 27/30; G02B 21/06; G02B 21/0032; G02B 21/16; G02B 21/10; G02B 21/367
USPC .......................................................... 359/390
See application file for complete search history.

(56) References Cited

U.S. PATENT DOCUMENTS 4,576,450 A * 3/1986 Westphal ................. G02B 7/24
                                                      359/372
4,691,997 A    9/1987 Muchel
5,969,854 A   10/1999 Stelzer et al.
(Continued)

FOREIGN PATENT DOCUMENTS

DE    102010013223 A1    9/2011
WO       2012122027 A2    9/2012

OTHER PUBLICATIONS

US Receiving Office, International Search Report for International Application No. PCT/US2015/011160, dated May 6, 2015, 2 pages.
(Continued)

*Primary Examiner* — William R Alexander
*Assistant Examiner* — Henry A Duong
(74) *Attorney, Agent, or Firm* — Kolisch Hartwell, P.C.

(57) ABSTRACT

Systems and methods for generating light sheets suitable for use in single plane illumination microscopy may include a series of chambers in sequential communication with each other, the series of chambers including an optics system configured to convert a beam of light, such as a laser beam, into a planar light sheet. The series of chambers may include chambers having respective long axes oriented at an acute angle to each other to form a compact zig-zag pattern.

20 Claims, 4 Drawing Sheets

(51) Int. Cl.
*G02B 21/10* (2006.01)
*G02B 21/36* (2006.01)

(56) References Cited

U.S. PATENT DOCUMENTS

| | | | |
|---|---|---|---|
| 6,693,945 | B1 | 2/2004 | Shimada |
| 7,554,725 | B2 | 6/2009 | Stelzer et al. |
| 7,787,179 | B2 | 8/2010 | Lippert et al. |
| 8,629,413 | B2 | 1/2014 | Betzig et al. |
| 8,730,573 | B2 | 5/2014 | Betzig et al. |
| 2003/0086145 | A1 | 5/2003 | DeSimone et al. |
| 2006/0033935 | A1 | 2/2006 | Keightley et al. |
| 2009/0237765 | A1 | 9/2009 | Lippert et al. |
| 2011/0134521 | A1 | 6/2011 | Truong et al. |
| 2011/0304723 | A1 | 12/2011 | Betzig |
| 2012/0176674 | A1 | 7/2012 | Lippert et al. |
| 2012/0200829 | A1 | 8/2012 | Bronstein et al. |
| 2012/0281264 | A1 | 11/2012 | Lippert et al. |
| 2013/0107358 | A1 | 5/2013 | Knebel et al. |
| 2013/0181143 | A1 | 7/2013 | Betzig et al. |
| 2013/0302905 | A1 | 11/2013 | Kalkbrenner et al. |
| 2014/0063495 | A1* | 3/2014 | Kimura ............... G01N 21/65 356/300 |
| 2014/0126046 | A1 | 5/2014 | Schroff et al. |
| 2014/0300958 | A1 | 10/2014 | Knebel et al. |
| 2015/0198794 | A1 | 7/2015 | Rondeau |

OTHER PUBLICATIONS

US Receiving Office, Written Opinion for International Application No. PCT/US2015/011160, dated May 6, 2015, 8 pages.
United States Patent and Trademark Office, Office Action for U.S. Appl. No. 14/595,579, dated Dec. 11, 2015, 26 pages.
United States Patent and Trademark Office, Office Action for U.S. Appl. No. 14/595,579, dated Sep. 8, 2016, 27 pages.
European Patent Office, Extended European Search Report for European Application No. 15737356.4, dated Aug. 18, 2017, 9 pages.

* cited by examiner

LIGHT SHEET GENERATOR

CROSS-REFERENCES

This application is a continuation of U.S. patent application Ser. No. 14/595,579, filed Jan. 13, 2015, which is based upon and claims the benefit under 35 U.S.C. § 119(e) of U.S. Provisional Patent Application Ser. No. 61/927,179, filed Jan. 14, 2014. The complete disclosure of the above-identified patent applications are hereby incorporated by reference for all purposes.

FIELD

This disclosure relates to sample illumination for microscopes. More specifically, the disclosed embodiments relate to systems and methods for generation of light sheets in fields such as single plane illumination microscopy (SPIM).

INTRODUCTION

Single plane illumination microscopy (SPIM), or light sheet microscopy, utilizes a microscope objective having a first axis of observation. A light sheet is generated to illuminate a sample, and the light sheet consists of a collimated plane of light oriented transverse to the first axis. In some examples, the first axis is orthogonal to the plane of the light sheet. The objective is typically focused at the plane of the light sheet. In some examples, the sample is also repositioned relative to the light sheet in order to observe various levels/planes of the sample. Multiple images may be acquired in this fashion in order to create a 3-D image of the sample. If the image is changing over time, multiple such 3-D image compilations may also be taken over time, resulting in so-called 4-D imaging. A light sheet generating device and method are described below and in the attached materials.

In the last decade, light sheet fluorescence microscopy (LSFM) has emerged as a powerful imaging tool for cell and developmental biology. LSFM systems excite the sample with a thin light sheet and collect the resulting fluorescence along a perpendicular detection axis. Imaging volumes are collected by sweeping the light sheet and detection plane through the sample. As only the focal plane is illuminated at any instant, these microscopes provide highly efficient 'optical sectioning'; unlike confocal microscopes that use a pinhole to reject background, little fluorescence is wasted on its way to the detector and photodamage/bleaching are confined to the vicinity of the focal plane. Since a wide field detector (camera) is used to collect information from the entire imaging plane simultaneously, high signal-to-noise ratio (SNR) images may be obtained with low excitation intensities, minimizing undesirable effects like dye saturation. Collectively, these advantages result in instruments that are much faster, much gentler, and provide images with much better SNR than laser scanning confocal microscopy. LSFM has been particularly beneficial in long-term 4D imaging studies, as in the embryogenesis of model organisms such as *C. elegans*, zebrafish, and *Drosophila*. Recent efforts have improved the spatiotemporal resolution of LSFM, and have enabled the study of fast, intracellular dynamics that would have been otherwise impossible to capture with other 4D imaging systems.

Modern LSFM systems use one objective lens to deliver the excitation sheet and another to collect the fluorescence. The required perpendicularity between excitation and detection forces the use of relatively long working distance objectives and constrains the sample geometry relative to single objective epi- or confocal fluorescence microscopy. Many LSFM implementations embed the sample in agarose, translating the resultant gel appropriately to the common focal point of the objectives. By rotating the sample, specimen views acquired at different angles may be fused together into a composite volume, increasing the overall image quality by masking the effects of scattering and light sheet degradation that plague individual views. Moreover, multiview deconvolution can be applied to compensate for the poor axial resolution of any single view with the much better lateral resolution inherent to a corresponding perpendicular view, improving resolution isotropy.

While appropriate for large embryos like zebrafish or *Drosophila*, embedding the sample in agarose is cumbersome for a large variety of samples that are more easily grown or deposited on conventional glass coverslips. Inverted selective plane illumination microscopy (iSPIM) is a version of LSFM that is compatible with glass cover slips. In iSPIM, two perpendicular, water dipping objectives are placed above a sample mounted in an inverted microscope stand. A light sheet is introduced with one objective and scanned through the sample, and the second objective is translated with a piezoelectric stage in order to keep the imaging plane in focus during scanning. The sample can be easily found with a low magnification objective mounted in the epi-fluorescence port of the inverted microscope, and translated to the focus of each objective. A modified version of iSPIM may be utilized to capture a second specimen view, by alternating excitation and detection between the two objectives. The resulting dual-view inverted selective plane illumination microscope (diSPIM) may provide isotropic spatial resolution (down to 330 nm) at high speed (200 images/second, 0.5 seconds for a 50 plane volume).

The devices described herein may be compatible with fiber-coupled laser excitation (making it much easier to align the excitation path, making the device compatible with a broad array of commercial laser excitation sources, and assuring collinearity between different excitation wavelengths). Instead of controlling multiple galvanometric mirrors, compact scan-heads (one for each specimen view) may be used to generate and sweep the excitation sheets through the sample, also aiding system alignment. Freely available LabVIEW data acquisition software may be utilized for generating and sweeping the light sheets, controlling and synchronizing objective piezos, and recording images from scientific complementary metal-oxide-semiconductor (CMOS) cameras.

SUMMARY

The present disclosure provides systems and methods for light sheet generation. In some embodiments, a light sheet generating system may include a housing including a plurality of elongate internal chambers in sequential communication with each other and containing an optics system. A first chamber may contain a first lens, a second chamber may extend from the first chamber and contain a second lens, a third chamber may extend from the second chamber, and a fourth chamber may extend from the third chamber and contain a third lens, each chamber having a respective long axis. A light source mount may be included at a first end of the housing, the mount configured to receive a light source and direct a light beam down the long axis of the first chamber. The first lens may be configured to focus the laser beam onto a first mirror. The second lens may be configured to collimate the laser beam after reflecting from the first mirror. The second mirror may be configured to steer the collimated laser beam into a fan shape. The third lens may be configured to collimate the fan shaped laser into a light sheet. The long axes of each pair of consecutive cavities may form an acute angle.

In some embodiments, a system for conducting light sheet microscopy may include a microscope having an objective including an objective axis, a sample apparatus configured to hold a sample spaced from the objective along the objective axis, and a light sheet generating assembly configured to generate a planar sheet of collimated light intersecting the sample at an angle transverse to the objective axis. The light sheet generating assembly may include a laser source operatively connected to a first elongate chamber containing a first lens, a first reflector disposed at a terminal end of the first chamber, a second elongate chamber containing a second lens and arranged at an acute angle with respect to the first chamber, a second reflector disposed at a terminal end of the second chamber, a third elongate chamber arranged at an acute angle with respect to the second chamber, a third reflector disposed at a terminal end of the third chamber, and a fourth elongate chamber containing a third lens and arranged at an acute angle with respect to the third chamber. The second reflector may include a scanning mirror.

In some embodiments, a method for generating a light sheet suitable for use in a microscope may include generating a light beam using a light beam source. The beam may be directed into an optics system disposed in a housing by directing the beam into a first chamber of a series of elongate chambers contained by the housing, a long axis of each successive chamber being oriented at an acute angle with respect to the long axis of the immediately preceding chamber. The beam may be focused, using a first lens, onto a first mirror. The beam may be redirected, using the first mirror, toward a second lens. The beam may be collimated using the second lens. The beam may be redirected and fanned using a scanning second mirror. The fanned beam may be collimated using a third lens.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 4 is an illustration of steps performed in an exemplary method for generating a light sheet for use in light sheet microscopy or the like.

DESCRIPTION

Overview

Various embodiments of light sheet generation systems and methods are described below and illustrated in the associated drawings. Unless otherwise specified, a light sheet generation system and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other light sheet generation systems and methods. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Light sheet generation devices and systems may be interchangeably termed light sheet scanners, light sheet generators, and/or light sheet scan units or modules. A light sheet scanner generates a planar sheet of light by passing a collimated laser beam through a folded optics system. The folded optics system includes a plurality of lenses, one or more folding mirrors, and/or one or more scanning mirrors arranged to generate a light sheet suitable for use by a SPIM (and/or iSPIM and/or diSPIM) microscope.

Figure 1:
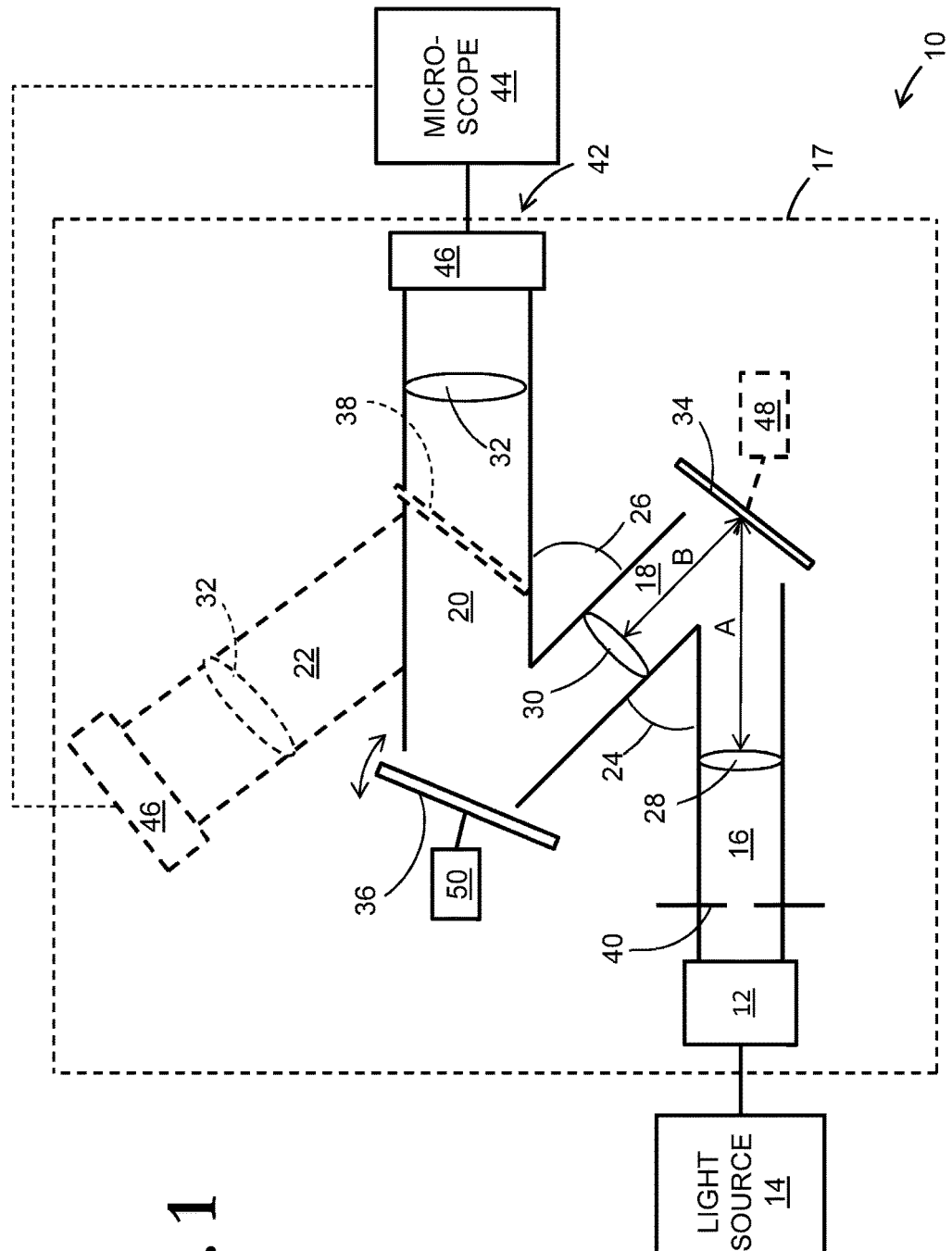
FIG. 1 is a schematic diagram of an illustrative light sheet generation device in accordance with aspects of the present disclosure.

A light sheet generator is shown schematically in FIG. 1, and generally indicated at 10. Light sheet generator 10 may include a light source interface 12 configured to receive a light source 14, such as a laser. Interface 12 may be configured to direct a light (e.g., laser) beam from light source 14 into and through a first chamber 16 within light sheet generator 10. For example, light source interface 12 may be coaxial with first chamber 16.

A series of elongate cavities or internal tunnels similar to chamber 16 may be arranged within generator 10 (e.g., within a housing 17 or other enclosure), and each successive pair of chambers may be in communication with each other. For example, as shown in FIG. 1, first chamber 16 may be followed by a second chamber 18, and a third chamber 20. Optionally, a fourth chamber 22 (shown in dashed lines) may proceed from third chamber 20. In some examples, additional chambers may be included beyond three or four. The respective long axis of each of the chambers may be arranged such that the chambers collectively form a zig-zag pattern. More specifically, the intersection of each pair of long axes associated with successive chambers may form a respective acute angle. This relationship is indicated, for example, at angles 24 and 26. Such a zig-zag pattern may result in a more compact device.

An optics system may be housed within light sheet generator 10. A portion of the optics system may be disposed within or adjacent to chambers 16, 18, 20, and 22 (if present). For example, a plurality of lenses may be included. For example, first chamber 16 may include a first lens 28, second chamber 18 may include a second lens 30, and third chamber 20 may include a third lens 32. Optionally, third lens 32 may be located within fourth chamber 22, if present.

Light sheet generator 10 may further include a plurality of mirrors to direct and shape the beam as it passes through the chambers. For example, a first mirror 34 may be disposed at a terminal end of first chamber 16, and a second mirror 36 may be disposed at a terminal end of second chamber 36. If fourth chamber 22 is included, a third mirror 38 (e.g., a fold mirror) may be included to direct the beam into the fourth chamber. Each of these mirrors may include any suitable structure or device configured to reflect a beam of light at a selected angle. In some examples, the selected angle may be adjustable. In some examples, the selected angle may be altered with respect to time, such as in a scanning mirror.

An aperture 40, such as an iris or diaphragm, may be included in first cavity 16 between light source interface 12 and first lens 28. Aperture 40 may be configured to stop down the beam from light source 14, and may be adjustable.

The optics system, including lenses 28, 30, and 32 as well as mirrors 34, 36, and 38 (if present), are configured to receive a beam (e.g., laser beam) entering the system at light source interface 12 and convert the beam into a planar light sheet at a system exit 42. The planar light sheet would be usable by a device 44 such as a microscope. Accordingly, light sheet generator 10 may include a microscope interface 46. Microscope interface 46 may include any suitable structure configured to facilitate secure attachment of light sheet generator 10 to a light receiving portion of microscope 44. Microscope 44 may include an objective axis, and a sample apparatus configured to hold a sample spaced from the objective along the objective axis. Light sheet generator 10 may be configured to generate a planar sheet of collimated light intersecting the sample at an angle transverse to the objective axis.

Lenses 28 and 30 may be arranged as a 4f pair. In other words, a distance A from first lens 28 to first mirror 34 may be equal to the focal length of first lens 28. Similarly, a distance B from first mirror 34 to second lens 30 may be equal to the focal length of second lens 30. Accordingly, the effective distance between first lens 28 and second lens 30 (i.e., A+B) is the sum of the respective focal lengths. Excluding other optical effects, this arrangement of the lenses results in a beam exiting second lens 30 that has similar or identical characteristics to the beam that entered first lens 28. A similar arrangement may exist between lenses 30 and 32.

First mirror 34 and/or second mirror 36 may be configured to produce selected optical effects on the beam. For example, first mirror 34 may be configured as an anti-striping mirror (explained further below), such that the first mirror is caused to tilt rapidly on one or more axes by an actuator 48. In some embodiments, first mirror 34 may be stationary, functioning simply as a folding mirror to redirect the beam. In some embodiments, the angle of first mirror 34 may be adjustable.

Second mirror 36 may be configured as a scanning mirror, such that the mirror tilts rapidly back and forth in two dimensions and creates a fanning effect in the beam. In other words, a point created by the beam impinging on a surface would be reflected back and forth by mirror 36 such that the beam would instead create a line segment on the surface. The tilting of mirror 36 may be driven by a scanning actuator 50. This fanning of the beam may be collimated by third lens 32. Accordingly, the beam remains at a selected width following the third lens, and the fanning effect does not continue beyond the third lens.

Third mirror 38, if present, may include a stationary (e.g., adjustable) reflector between scanning mirror 36 and third lens 32. Mirror 38 may function to fold the beam, reflecting the beam down the length of chamber 22.

Light sheet generator 10 may be described as compact due to the zig-zag pattern created by chambers arranged at acute angles. Generator 10 may be described as modular because it may be separate from, and attachable to, any suitable light source and/or microscope.

EXAMPLES, COMPONENTS, AND ALTERNATIVES

The following examples describe selected aspects of exemplary light sheet generators, as well as related systems and/or methods. These examples are intended for illustration and should not be interpreted as limiting the entire scope of the present disclosure. Each example may include one or more distinct inventions, and/or contextual or related information, function, and/or structure.

Example 1

Figure 2:
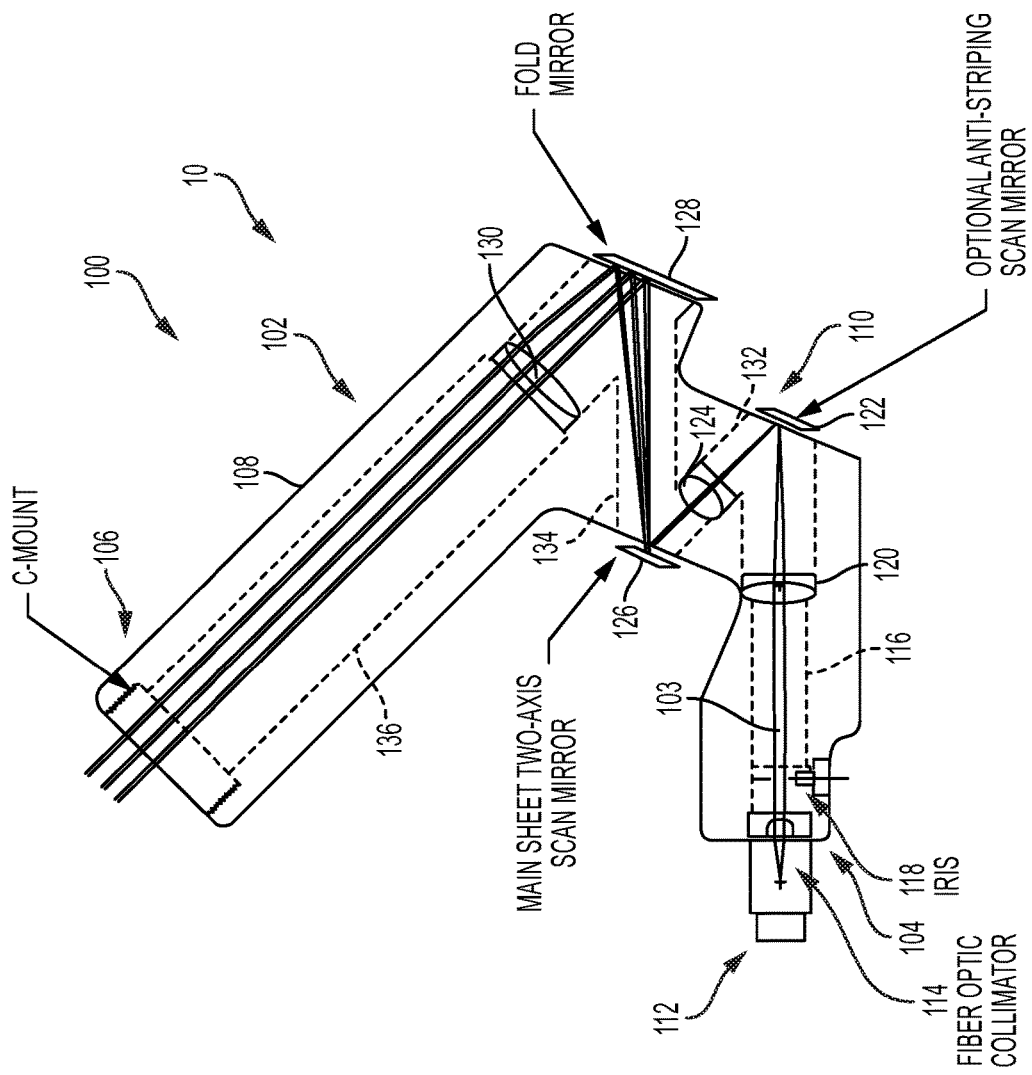
FIG. 2 is an illustrative embodiment of a light sheet generator in accordance with aspects of the present disclosure.
Figure 3:
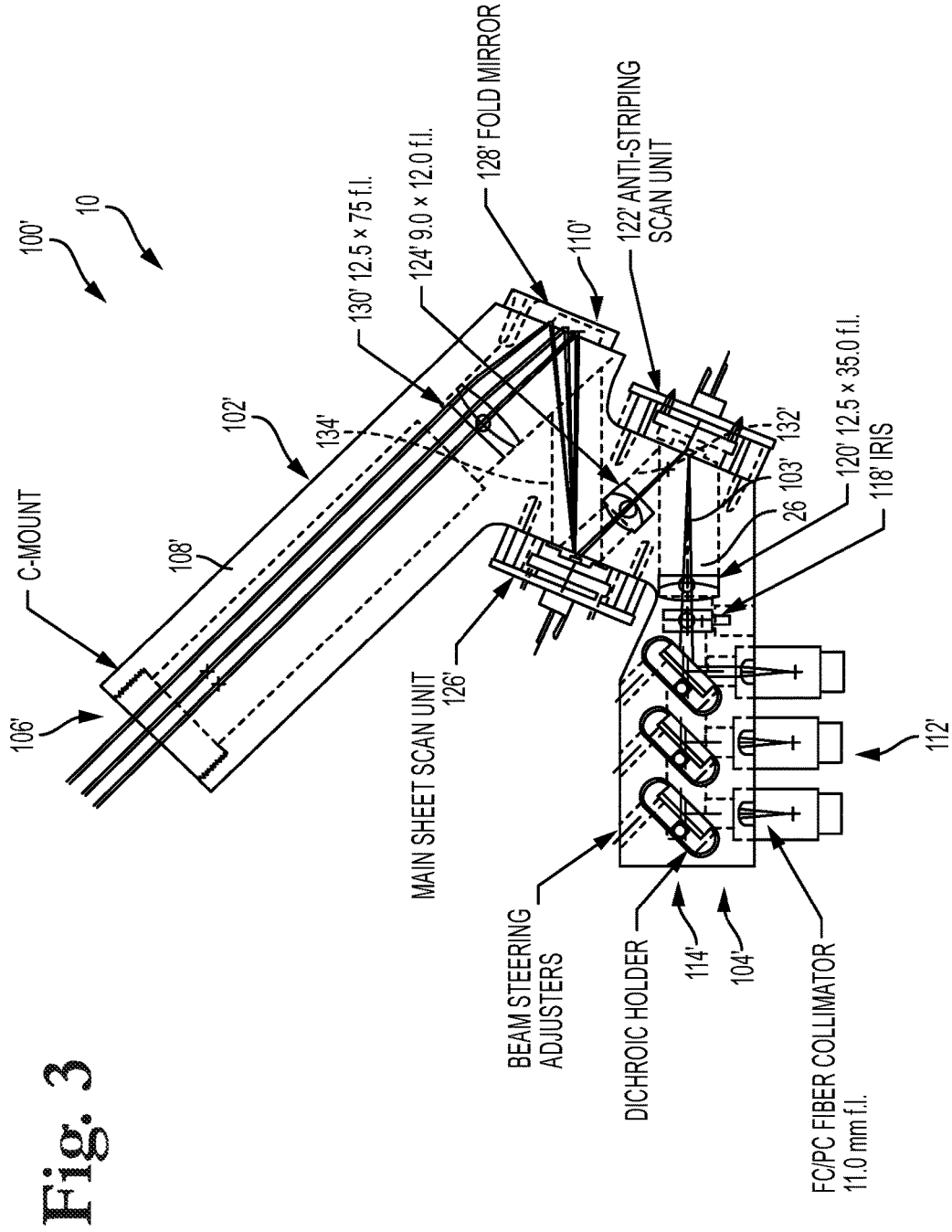
FIG. 3 is another illustrative embodiment of light sheet generator in accordance with aspects of the present disclosure.

FIGS. 2 and 3 show illustrative light sheet scanner devices 100 and 100'. Light sheet scanners 100 and 100' are embodiments of light sheet generator 10, and may therefore include corresponding components. Such corresponding components will have corresponding names, and may be identified below and/or indicated by appropriate reference numbers in FIGS. 2 and 3.

Light sheet scanners 100 and 100' include similar components having similar descriptions. Accordingly, both scanners will be described simultaneously using unprimed and primed respective reference numbers, and with selected differences being identified as needed. Light sheet scanner 100, 100' may include a body 102, 102' having a laser mount 104, 104' at one end, a microscope mount 106, 106' at another end, and a housing 108, 108' containing an optics system 110, 110'. Body 102, 102' may include housing 108, 108' as well as mounting hardware, adjustment devices, openings, threaded connections, and/or mounting surfaces suitable for containing the remaining components of scanner 100, 100' and for attaching scanner 100, 100' to another device such as a microscope, camera, and/or support base.

Body 102, 102' may include a plurality of connected internal cavities or pathways (also referred to as chambers), through which a beam 103, 103' travels. Housing 108, 108' may be constructed of rigid material, or a combination of rigid components with semi-rigid and/or resilient material. Housing 108, 108' may be configured to protect internal components from the environment. For example, housing 108, 108' may be dust-proof, water resistant, and/or resistant to mechanical shock. In some examples, housing 108, 108' may be configured to prevent or resist build up of a static electrical charge. In some examples, housing 108, 108' may be configured to exclude unwanted external light from the internal pathways.

Laser mount 104, 104' may include any suitable structure configured to enable attachment of a laser-generating device in a predetermined orientation. For example, a laser mount 104 may be configured to allow a coaxially mounted laser source 112, as shown in FIG. 2. In other examples, such as the one shown in FIG. 3, a laser mount 104' may be configured to connect with a transverse-mounted laser source 112'.

Laser mount 104, 104' may include a collimation device 114, 114'. In other examples, collimation device 114, 114' may be part of or integral with laser source 112, 112'. Collimation device 114, 114' may include any suitable device configured to collimate light emitted by the laser source. In some examples, such as the one shown in FIG. 3, multiple laser sources may be included. Collimation device 114' may be configured to collimate the light from all of the sources into a single collimated beam. Together, laser mount 104, 104', laser source 112, 112', and collimation device 114, 114' are configured to create a collimated laser beam 103, 103' directed down a path parallel to the long axis of a first internal pathway 116, 116' in body 102, 102'.

Microscope mount 106, 106' may include any suitable structure configured to enable attachment of scanner 100, 100' to a microscope or other device, wherein the generated light sheet is provided to the device through the mount. For example, microscope mount 106, 106' may include a standard C-mount. For example, a typical C-mount may have a 1-inch diameter, threaded aperture having 32 threads per inch. Other mounting devices and arrangements may be included.

Optics system 110, 110' may include any suitable devices and systems configured to convert a collimated beam of light from a laser source into a light sheet suitable for use in a SPIM microscope. In the example shown in FIGS. 2 and 3, optics system 110, 110' includes an iris 118, 118', a first lens 120, 120', a first mirror 122, 122', a second lens 124, 124', a scan mirror 126, 126', a fold mirror 128, 128', and a third lens 130, 130'. In other examples, iris 118, 118' may be absent and/or more or fewer lenses and/or mirrors may be present.

Iris 118, 118' (also referred to as an aperture, e.g., aperture 40) may include any suitable structure or device configured to stop down or resize the collimated laser beam from laser source 112, 112' by a desired amount. For example, iris 118, 118' may include an aperture or opening in an otherwise opaque structure. In some examples, iris 118, 118' includes a diaphragm that may be adjusted to alter the size of the opening in iris 118, 118' as desired.

First lens 120, 120' is disposed in the path of the collimated laser beam within first internal pathway 116, 116'. First lens 120, 120' may include any suitable lens-like optical structure configured to focus the collimated laser beam onto first mirror 122, 122'. For example, first lens 120, 120' may include a compound lens. For example, first lens 120, 120' may include a doublet, such as a concave and a convex lens in contact with each other. In the example shown in FIGS. 2 and 3, first lens 120, 120' includes a convex and concave lens doublet with the convex lens oriented toward the laser source. In some examples, first lens 120, 120' may comprise a 4f lens pair with second lens 124, 124', as described above, such that the effective lens separation distance is approximately equal to the sum of the focal lengths of the first and second lenses.

First mirror 122, 122' may be disposed at the end (or an end portion) of first internal pathway 116, 116', and may be oriented to redirect beam 103, 103' down a second internal pathway 132, 132', which may be in communication with first internal pathway 116, 116'. First mirror 122, 122' may include any suitable device, structure, and/or surface configured to reflect the beam focused thereon by first lens 120, 120' and in so reflecting, pass the beam down the long axis of second internal pathway 132, 132' toward second lens 124, 124'.

In some examples, first mirror 122, 122' includes an adjustable, static, angled mirror. In some examples, first mirror 122, 122' includes a scanning mirror configured to prevent or reduce striping, alternatively referred to as an anti-striping scan mirror and/or anti-striping mirror. Striping refers to the undesired shadowing effect of a light sheet that has been blocked at certain points by nontransparent structures within the sample. This effect may be overcome or reduced by rapidly alternating the angle of the light sheet (within the plane of the light sheet) to essentially steer light around the obstacles, first on one side then on the other.

Accordingly, first mirror 122, 122' may include a scanning feature that rapidly and symmetrically alternates the angle of the mirror. This scanning may be accomplished by any suitable means. In some examples, mirror scanning of mirror 122, 122' may be effected using a suitable galvanometer scanner to steer the moveable mirror. In some examples, mirror 122, 122' may include a micromirror, interchangeably referred to herein as a micromirror device. In some examples including a micromirror device, an array of miniature or microscopic mirrors may be responsive to an electromagnetic field, and may be controlled by applying a voltage to one or more electrodes adjacent to the array. In some preferred examples, the micromirror device may include a single mirror rather than an array. The micromirror device may be fabricated from a material such as silicon using photolithographic methods similar to those used to fabricate integrated electronic circuits. In the example shown, each micromirror device has a single mirror that may be tilted about one or more axes, such as two perpendicular axes, or directions by applying appropriate electrical signals. The micromirror device may be described as a micro-electromechanical system (MEMS) that may be used to reflect light in a controlled manner.

Second lens 124, 124' may be disposed in second internal pathway 132, 132' in the path of the beam reflected by first mirror 122, 122'. Second lens 124, 124' may be positioned at a distance from first mirror 122, 122' corresponding to the focal length of second lens 124, 124'. Second lens 124, 124' may include any suitable lens-like optical structure configured to collimate the beam. For example, second lens 124, 124' may include a compound lens. For example, second lens 124, 124' may include a doublet, such as a concave and a convex lens in contact with each other.

In the example shown in FIG. 1, second lens 124, 124' includes a convex and concave lens doublet with the convex lens oriented away from the laser source. As explained above, first lens 120, 120' may comprise a 4f lens pair with second lens 124, 124'. In some examples, second lens 124, 124' may comprise a 4f lens pair with third lens 130, 130'. In some examples, second lens 124, 124' may comprise a first 4f lens pair with first lens 120, 120' and a second 4f lens pair with third lens 130, 130'.

Scan mirror 126, 126' may be disposed at the end (or an end portion) of second internal pathway 132, 132', and may be oriented to redirect the beam down a third internal pathway 134, 134', which may be in communication with second internal pathway 132, 132'. Scan mirror 126, 126' may include any suitable device, structure, and/or surface configured to reflect the beam directed thereon by second lens 124, 124' and in so reflecting, pass the beam down the long axis of third internal pathway 134, 134' toward fold mirror 128, 128'.

Moreover, scan mirror 126, 126' may be configured as a scanning mirror. Unlike first mirror 122, 122', which may steer the beam to overcome striping, scan mirror 126, 126' may be configured to scan such that the collimated beam is steered back and forth within a plane, in a relatively wide, fan-like manner. Accordingly, scan mirror 126, 126' may include a scanning feature that rapidly and symmetrically alternates the angle of the mirror. This scanning may be referred to as vector scanning, and may be accomplished by any suitable means. In some examples, mirror scanning of mirror 126, 126' may be effected using a suitable galvanometer scanner to steer the moveable mirror. In some examples, mirror 126, 126' may include a micromirror device, as described above regarding mirror 122, 122'.

At the other end (or end portion) of third internal pathway 134, 134' lies fold mirror 128, 128'. Fold mirror 128, 128' may be oriented to redirect the fanned beam down a fourth internal pathway 136, 136', which may be in communication with third internal pathway 134, 134'. Fold mirror 128, 128' may include any suitable device, structure, and/or surface configured to reflect the beam directed thereon by scan mirror 126, 126' and in so reflecting, pass the beam down the long axis of fourth internal pathway 136, 136' toward third lens 130, 130'. Fold mirror 128, 128' may function to reduce the overall size or footprint of light sheet scanner 100, 100' while maintaining the effective overall length of the optical pathway therein. Fold mirror 128, 128' may be fixed at a predetermined angle. In some examples, the angle and/or position of fold mirror 128, 128' may be adjustable. In some examples, mirror 128, 128' may be omitted.

Third lens 130, 130' may be disposed in fourth internal pathway 136, 136' in the path of the fanned beam reflected by fold mirror 128, 128'. Third lens 130, 130' may be positioned at a distance from fold mirror 128, 128' corresponding to the focal length of third lens 130, 130'. Third lens 130, 130' may include any suitable lens-like optical structure configured to collimate the beam. In other words, third lens 130, 130' may refract the fanned beam such that a collimated plane of light, or light sheet, is created. For example, third lens 130, 130' may include a compound lens. For example, third lens 130, 130' may include a lens doublet.

Once the beam has passed through third lens 130, 130', it is in a condition suitable for use as a light sheet in a SPIM microscope. The light sheet may pass through the aperture in microscope mount 106, 106' and intersect the sample as desired.

Example 2

In some embodiments, a diSPIM microscope (e.g., device 44) may utilize two light sheet scanners, such as light sheet generators 10, 100, and/or 100', one for each objective. Each light sheet scanner may be used in an arm portion of the microscope. The scanners may use integrated 2D MEMS mirrors to provide light weight, low vibration optical scanning of light from a single mode fiber-coupled laser. The basic design of the unit may include a series of 4f lens pair arrangements with the scan mirrors, apertures, and focal planes located at the foci of the lenses, as described above.

The input to each light sheet scanner may include a fiber collimator (e.g., collimator 114, 114') that accepts a single-mode FC/PC (or optionally FC/APC) connected fiber-coupled laser source (e.g., source 112, 112'). The fiber collimator may be an exchangeable part that allows some flexibility in the focal length, and hence intrinsic beam diameter, and fiber connector type. The collimated laser beam may be stopped down with an iris diaphragm (e.g., iris 118, 118') if desired, thereby creating light sheets with different thicknesses that are suitable for samples of varying size.

The collimated laser is focused onto the first fold mirror (e.g., mirror 122, 122'), which can optionally be a micromirror scanner that is located in the equivalent image optical image plane as the microscope objective specimen focus plane. In examples using such a scanner, the direction of the focused laser beam may tilt about the focus point, thus providing an anti-striping capability. After reflecting from the first fold mirror, the focused light is collimated again and projected onto the main 2D MEMS scanner mirror. The main scan mirror may be in the equivalent optical plane as the microscope objective back focal plane. Tilting the scan mirror thus steers the focused laser beam to different positions in the sample focus plane.

As suggested by the C-mount connection (e.g., mount 106, 106'), simply connecting scanner 10, 100, 100' to any properly positioned microscope C-mount camera port will allow the scanner to be used to position a focused laser spot at the microscope's sample plane. For diSPIM applications, the camera tube lens may be positioned to image collimated light into the objective back focal plane so that the focused laser beam remains parallel to the optical axis when scanning off-axis.

To use the scanners to create and sweep light sheets through a sample, analog voltages may be applied to one or more/each axis of the MEMS mirrors.

Example 3

Figure 4:
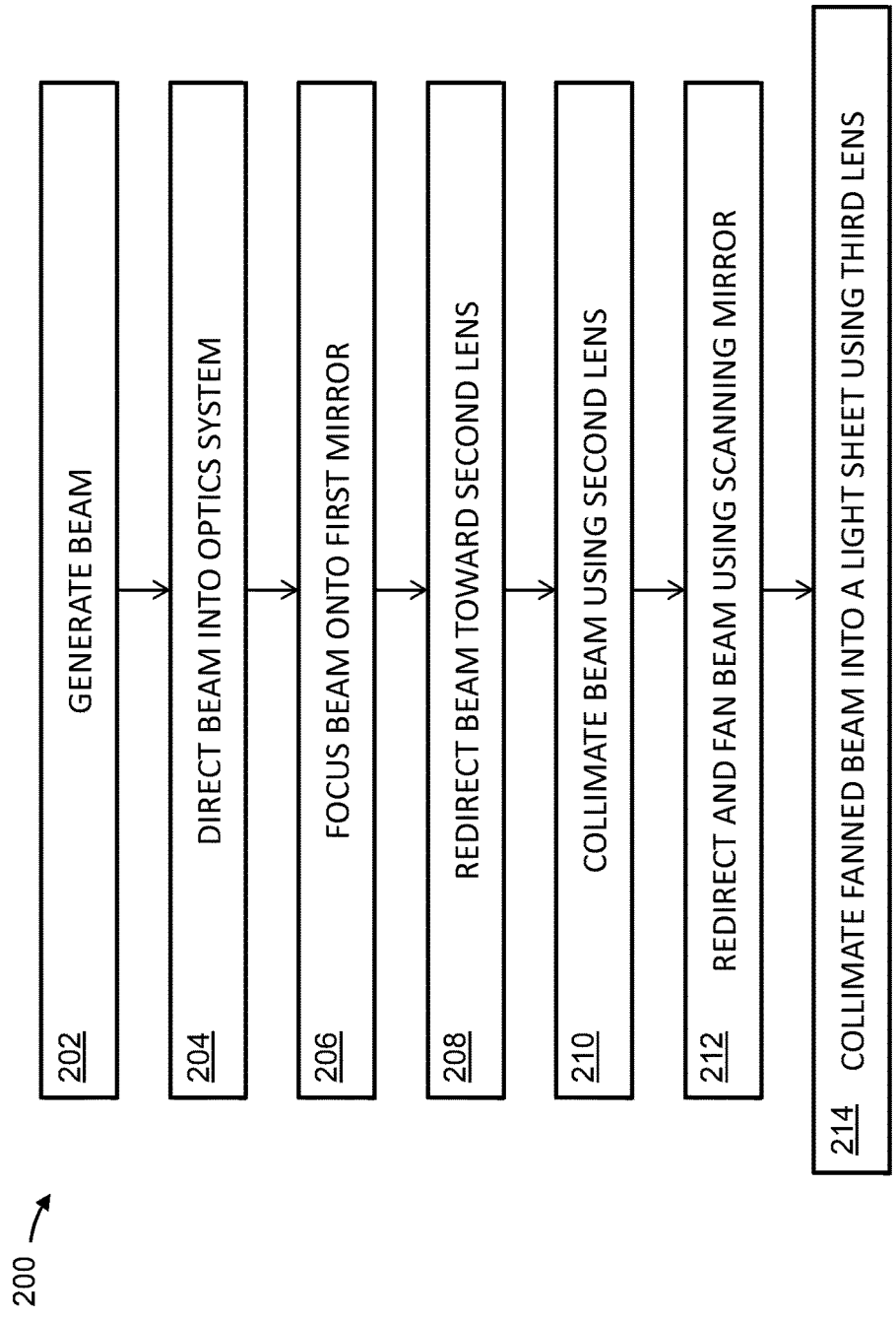

This example describes a method for generating a light sheet suitable for use in a SPIM microscope; see FIG. 4. Aspects of the light sheet generators described above may be utilized in the method steps described below. Where appropriate, reference may be made to previously described components and systems that may be used in carrying out each step. These references are for illustration, and are not intended to limit the possible ways of carrying out any particular step of the method.

FIG. 4 is a flowchart illustrating steps performed in an illustrative method, and may not recite the complete process or all steps of the method. FIG. 4 depicts multiple steps of a method, generally indicated at 200, which may be performed in conjunction with a light sheet generator according to aspects of the present disclosure. Although various steps of method 200 are described below and depicted in FIG. 4, the steps need not necessarily all be performed, and in some cases may be performed in a different order than the order shown.

At step 202, a beam may be generated using a light beam source, such as a laser. Step 202 may include collimating the beam after the beam is generated.

Step 204 includes directing the beam into an optics system disposed in a housing containing a series of elongate chambers. Directing the beam into the optics system may include directing the beam into a first chamber of the series of elongate chambers. A long axis of each successive chamber may be oriented at an acute angle with respect to the long axis of the immediately preceding chamber.

Step 206 includes focusing the beam onto a first mirror using a first lens. The first mirror may be disposed adjacent to a distal end of a first chamber of the series of elongate chambers.

Step 208 includes redirecting the beam with the first mirror toward a second lens. The second lens may be disposed in a second chamber of the series of elongate chambers. Accordingly, redirecting the beam may include directing the beam down the second chamber in a direction substantially parallel to the long axis of the chamber. In some examples, redirecting the beam with the first mirror includes tilting or rapidly pivoting the first mirror in an alternating fashion to reduce a striping effect in the microscope, as described above. Rapid pivoting of the first mirror may be performed using a micromirror device.

Step 210 includes collimating the beam with the second lens. In other words, the beam may exit the second lens in a condition substantially identical to the condition in which it entered the first chamber. In some examples, the second lens may form a 4f lens pair with the first lens.

Step 212 includes redirecting and fanning the beam with a scanning second mirror. Scanning may include rapid tilting or pivoting of the second mirror to cause the beam to fan out in a selected plane. The scanning second mirror may include a micromirror device. In some examples, step 212 may further include reflecting the fanned laser beam toward a third lens using a third mirror.

Step 214 includes collimating the fanned beam using the third lens to create a light sheet. Collimating may include refracting the fanned beam such that the width of the beam in the selected plane would be essentially constant following the third lens. In some examples, the third lens may form a 4f lens pair with the second lens.

The light sheet may then be directed into or received by a microscope, such as for use in SPIM microscopy or the like.

Example 4

This section describes additional aspects and features of compact light sheet generators, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A system for generating a light sheet for use in a microscope, such as a SPIM, iSPIM, and/or diSPIM microscope, the system comprising:

a housing including a plurality of elongate internal chambers in sequential communication with each other and containing an optics system, such that a first chamber contains a first lens, a second chamber extends from the first chamber and contains a second lens, a third chamber extends from the second chamber, and a fourth chamber extends from the third chamber and contains a third lens, each chamber having a respective long axis; and a light source mount at a first end of the housing, the mount configured to receive a light source and direct a light beam down the long axis of the first chamber;

wherein the first lens is configured to focus the laser beam onto a first mirror, the second lens is configured to collimate the laser beam after reflecting from the first mirror, the second mirror is configured to steer the collimated laser beam into a fan shape, and the third lens configured to collimate the fan shaped laser into a light sheet; and wherein the long axes of each pair of consecutive cavities form an acute angle.

A1. The system of paragraph A0, wherein the first mirror is an anti-striping mirror.

A2. The system of any of paragraphs A0-A1, wherein the second mirror is a scanning mirror.

A3. The system of any of paragraphs A0-A2, further including a third mirror between the second mirror and the third lens.

A4. The system of any of paragraphs A0-A3, further including a collimation device disposed between the laser source and the first lens.

A5. The system of any of paragraphs A0-A4, wherein the first lens and the second lens form a 4f lens pair.

A6. The system of any of paragraphs A0-A5, wherein the first lens has a focal length, and the first lens is spaced from the first mirror by a distance equivalent to the focal length.

B0. A system for conducting light sheet microscopy comprising:

a microscope having an objective including an objective axis;

a sample apparatus configured to hold a sample spaced from the objective along the objective axis;

a light sheet generating assembly configured to generate a planar sheet of collimated light intersecting the sample at an angle transverse to the objective axis;

wherein the light sheet generating assembly includes a laser source operatively connected to a first elongate chamber containing a first lens, a first reflector disposed at a terminal end of the first chamber, a second elongate chamber containing a second lens and arranged at an acute angle with respect to the first chamber, a second reflector disposed at a terminal end of the second chamber, a third elongate chamber arranged at an acute angle with respect to the second chamber, a third reflector disposed at a terminal end of the third chamber, and a fourth elongate chamber containing a third lens and arranged at an acute angle with respect to the third chamber;

wherein the second reflector is a scanning mirror.

B1. The system of paragraph B0, wherein the first reflector is an anti-striping scanning mirror.

B2. The system of any of paragraphs B0-B1, wherein the first lens has a focal length and the first lens is positioned a distance from the first reflector corresponding to the focal length.

B3. The system of any of paragraphs B0-B2, wherein the third reflector is mounted at an adjustable angle with respect to the third chamber.

B4. The system of any of paragraphs B0-B3, wherein the scanning mirror includes a micromirror device.

B5. The system of any of paragraphs B0-B4, wherein the light sheet generating assembly is modular.

B6. The system of any of paragraphs B0-B5, wherein the light sheet generating assembly includes a housing and the elongate chambers are contained in sequential communication within the housing.

B7. The system of paragraph B6, wherein the housing includes a laser source interface at a first end and a microscope interface at a second end.

B8. The system of paragraph B7, wherein the microscope interface includes a C-mount.

C0. A method for generating a light sheet suitable for use in a microscope, the method comprising:

generating a light beam using a light beam source;

directing the beam into an optics system disposed in a housing by directing the beam into a first chamber of a series of elongate chambers contained by the housing, a long axis of each successive chamber being oriented at an acute angle with respect to the long axis of the immediately preceding chamber;

focusing the beam with a first lens onto a first mirror;

redirecting the beam, using the first mirror, toward a second lens;

collimating the beam using the second lens;

redirecting and fanning the beam using a scanning second mirror;

collimating the fanned beam using a third lens.

C1. The method of paragraph C0, further including reflecting the fanned beam toward the third lens using a third mirror.

C2. The method of any of paragraphs C0-C1, further including reducing a striping effect in the microscope by rapidly pivoting the first mirror.

C3. The method of paragraph C2, wherein rapid pivoting of the first mirror is performed using a micromirror device.

C4. The method of any of paragraphs C0-C3, wherein the scanning second mirror includes a micromirror device.

C5. The method of any of paragraphs C0-C4, further including collimating the light beam after the beam is generated by the light beam source.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:

1. A system for generating a light sheet for use in a microscope, the system comprising:
 a housing including four elongate internal chambers in sequential communication with each other and containing an optics system, such that a first chamber contains a first lens, a second chamber extends from the first chamber and contains a second lens, a third chamber extends from the second chamber, and a fourth chamber extends from the third chamber and contains a third lens, each chamber having a respective long axis; and
 a laser source mount at a first end of the housing, the mount configured to receive a laser source and direct a laser beam down the long axis of the first chamber;
 wherein the first lens is configured to focus the laser beam onto a first mirror, the second lens is configured to collimate the laser beam after reflecting from the first mirror, the second mirror is configured to scan such that the collimated laser beam is steered back and forth within a plane in a fan shape, and the third lens is configured to collimate the fan shaped laser beam into a light sheet; and
 wherein the long axes of each pair of consecutive chambers form an acute angle, such that the four chambers collectively form a zig-zag pattern.

2. The system of claim 1, wherein the first mirror is an anti-striping mirror.

3. The system of claim 1, wherein the second mirror is a scanning mirror.

4. The system of claim 1, further including a third mirror between the second mirror and the third lens.

5. The system of claim 1, further including a collimation device disposed between the laser source and the first lens.

6. The system of claim 1, wherein the first lens and the second lens form a 4f lens pair.

7. The system of claim 1, wherein the first lens has a focal length, and the first lens is spaced from the first mirror by a distance equivalent to the focal length.

8. A method for generating a light sheet suitable for use in a microscope, the method comprising:
 generating a light beam using a light beam source;
 directing the beam into an optics system disposed in a housing by directing the beam into a first chamber of a series of elongate chambers contained by the housing, a long axis of each successive chamber being oriented at an acute angle with respect to the long axis of the immediately preceding chamber, such that the elongate chambers collectively form a zig-zag pattern;
 focusing the beam, using a first lens, onto a first mirror in the first chamber;
 redirecting the beam, using the first mirror, toward a second lens disposed in a second chamber of the series of elongate chambers;
 collimating the beam using the second lens;
 redirecting the beam using a second mirror disposed at a terminal end of a third chamber of the series of elongate chambers, the second mirror including a single scanning MEMS micromirror tiltable on at least one axis, wherein the second mirror is caused to scan such that the beam is steered back and forth within a plane in a fan shape; and
 collimating the fanned beam using a third lens in a fourth chamber of the series of elongate chambers.

9. The method of claim 8, further including reflecting the fanned beam toward the third lens using a third mirror.

10. The method of claim 8, further including reducing a striping effect in the microscope by rapidly pivoting the first mirror.

11. The method of claim 10, wherein rapid pivoting of the first mirror is performed using a micromirror device.

12. The method of claim 8, wherein the scanning second mirror includes a micromirror device.

13. The method of claim 8, further including collimating the light beam after the beam is generated by the light beam source.

14. A system for a light sheet for use in a microscope, the system comprising:
 a housing including four elongate internal chambers in sequential communication with each other and containing an optics system, such that a first chamber contains a first lens, a second chamber extends from the first chamber and contains a second lens, a third chamber extends from the second chamber, and a fourth chamber extends from the third chamber and contains a third lens, each chamber having a respective long axis; and
 a laser source mount at a first end of the housing, the mount configured to receive a laser source and direct a laser beam down the long axis of the first chamber;
 wherein the first lens is configured to focus the laser beam onto a first mirror, the second lens is configured to collimate the laser beam after reflecting from the first mirror, the second mirror is configured to tilt rapidly back and forth in two dimensions such that the collimated laser beam is steered into a fan shape, and the third lens is configured to collimate the fan shaped laser beam into a light sheet; and
 wherein the long axes of each pair of consecutive chambers form an acute angle, such that the four chambers collectively form a zig-zag pattern.

15. The system of claim 14, wherein the first mirror is an anti-striping scanning mirror.

16. The system of claim 14, wherein the first lens has a focal length and the first lens is positioned a distance from the first mirror corresponding to the focal length.

17. The system of claim 14, wherein the third mirror is mounted at an adjustable angle with respect to the third chamber.

18. The system of claim 14, wherein the system is modular.

19. The system of claim 14, wherein the housing includes a microscope interface at a second end.

20. The system of claim 19, wherein the microscope interface includes a C-mount.

* * * * *